United States Patent
Jang et al.

(10) Patent No.: US 9,496,573 B2
(45) Date of Patent: Nov. 15, 2016

(54) INTACT METHOD OF EVALUATING UNIT CELLS IN A FUEL CELL STACK AND A DEVICE USING THE SAME

(75) Inventors: Jong Hyun Jang, Seoul (KR); Kug-Seung Lee, Seoul (KR); Hyoung-Juhn Kim, Gyeonggi-do (KR); Eun Ae Cho, Seoul (KR); Soo-Kil Kim, Seoul (KR); Dirk Henkensmeier, Seoul (KR); Suk-Woo Nam, Seoul (KR); Tae Hoon Lim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 679 days.

(21) Appl. No.: 13/353,443

(22) Filed: Jan. 19, 2012

(65) Prior Publication Data

US 2013/0060506 A1    Mar. 7, 2013

(30) Foreign Application Priority Data

Sep. 5, 2011 (KR) .................. 10-2011-0089781

(51) Int. Cl.
*H01M 8/04828*  (2016.01)
*H01M 8/04*     (2016.01)

(52) U.S. Cl.
CPC ....... *H01M 8/0491* (2013.01); *H01M 8/04552* (2013.01); *Y02E 60/50* (2013.01)

(58) Field of Classification Search
CPC .............. H01M 8/04559; H01M 8/04589; H01M 8/04679; H01M 4/86; H01M 8/04582; H01M 8/04641; H01M 8/0458; H01M 8/04313; H01M 8/04537; H01M 8/04574; H01M 8/04634; H01M 8/04664; H01M 8/049929; Y02E 60/50; G01R 31/3679
USPC ................................................ 429/90, 428
See application file for complete search history.

(56) References Cited

U.S. PATENT DOCUMENTS 6,762,587 B1 * 7/2004 Barbetta .............. 320/116
2012/0276466 A1 * 11/2012 Sinha et al. .......... 429/430

OTHER PUBLICATIONS

Khan et al., Performance evaluation of platinum-based catalysts for the development of proton exchange membrane fuel cells, Turk J Chem 34 (2010), pp. 193-206.*
Khan et al., Evaluation of Catalytic Activity of Pt and Pt-Ru Catalysts for Electro-oxidation of Methanol in Acid Medium by Cyclic Voltammetry, Portugaliae Electrochimica Acta, 2009.*

* cited by examiner

*Primary Examiner* — Gregory J Toatley
*Assistant Examiner* — Kyle R Quigley
(74) *Attorney, Agent, or Firm* — Ladas & Parry LLP

(57) ABSTRACT

Disclosed are a method and an apparatus for an intact evaluation of the unit cells in a fuel cell stack. Since the degradation of the unit cells can be detected intactly, i.e. without disassembly of the stack, the time required for the detection and analysis thereof can be greatly reduced.

14 Claims, 9 Drawing Sheets

INTACT METHOD OF EVALUATING UNIT CELLS IN A FUEL CELL STACK AND A DEVICE USING THE SAME

CROSS-REFERENCE TO RELATED APPLICATIONS

This application claims priority under 35 U.S.C. §119 to Korean Patent Application No. 10-2011-0089781, filed on Sep. 5, 2011, in the Korean Intellectual Property Office, the disclosure of which is incorporated herein by reference in its entirety.

TECHNICAL FIELD

The present disclosure relates to a method and an apparatus for an intact evaluation of the unit cells in a fuel cell stack.

BACKGROUND

A fuel cell stack is prepared by connecting a plurality of unit cells. Each unit cell consists of a membrane electrode assembly (MEA) sandwiched between two gas diffusion layers (GDLs). The unit cells are separated by separators, and the MEA consists of catalyst layers of an anode and a cathode with an ion-conducting polymer electrolyte membrane between them. As the fuel cell stack is operated, degradation occurs in one or more unit cells for various reasons, resulting in degraded performance of the stack. The degradation of the unit cell occurs in the catalyst layer, a catalyst layer support, the electrolyte membrane, the separator, or the like.

At present, when degradation of stack performance occurs, the voltage of each cell is detected to detect a degraded cell and the stack is disassembled after stopping operation to analyze the cause in the cell. As such, since the disassembly of the fuel cell stack is necessary for evaluation of degraded unit cells and analysis of the underlying cause with the existing method, a method allowing evaluation of the degradation of unit cells in the fuel cell stack without disassembly of the stack is needed.

SUMMARY

The present disclosure is directed to providing a method and an apparatus allowing intact evaluation of the unit cells in a fuel cell stack (e.g. the degradation of unit cells in a fuel cell stack) without disassembly of the stack.

In one general aspect, the present disclosure provides an apparatus for evaluating the degradation of unit cells in a fuel cell stack.

The fuel cell stack includes: (1) n unit cells including a first unit cell, a second unit cell, . . . , and an n-th unit cell from left to right; (2) (n+1) separators including a first separator adjacent to the left side of the first unit cell, a second separator disposed between the first and second unit cells, . . . , an n-th separator disposed between the (n−1)-th and n-th unit cells, and an (n+1)-th separator adjacent to the right side of the n-th unit cell; and (3) two end plates adjacent respectively to the left side of the first separator and to the right of the (n+1)-th separator.

The apparatus for an intact evaluation of the unit cells in a fuel cell stack includes: (a) a current supplying device connected to the two end plates and supplying constant current; (b) at least one voltage measuring device measuring voltage between two separators selected from the (n+1) separators; and (c) a physical property determining device determining at least one physical property from $I_c$, $C_{dl}$, RF and EAS using at least one equation from the following equations from the current value supplied by the current supplying device and the voltage value between the two separators:

$$I_c = C_{dl}\frac{\Delta V_2}{\Delta t_2} + I_{etc} \qquad \text{Equation 1}$$

$$Q_H = (I_c - I_{etc})\Delta t_1 - C_{dl}\Delta V_1 \qquad \text{Equation 2}$$

$$RF = \frac{A_{real}}{A_{geo}} = \frac{QH}{B \times A_{geo}} \qquad \text{Equation 3}$$

$$EAS = \frac{QH}{B \times W_{Pt}} \qquad \text{Equation 4}$$

In the foregoing equations, $I_c$ is the supplied constant current, $\Delta t_2$ and $\Delta V_2$ are respectively time change and voltage change of an electrical double layer charging zone when the change in voltage is measured by a galvanostatic method, $C_{dl}$ is a capacity of the electrical double layer, and $I_{etc}$ is current occurring from factors other than hydrogen adsorption/desorption and electrical double layer charging current. $C_{dl}$ and $I_{etc}$ are respectively obtained as an average slope and an extrapolated y-intercept when at least two $\Delta V_2/\Delta t_2$ and at least two $I_c$ obtained from a galvanostatic experiment performed with at least two current values are respectively plotted as x and y values. $Q_H$ is hydrogen adsorption/desorption charge, and $\Delta t_1$ and $\Delta V_1$ are respectively time change and voltage change of a hydrogen adsorption/desorption zone when the change in voltage is measured by a galvanostatic method. RF is a roughness factor which is a ratio of surface area of platinum to area of a catalyst layer of a membrane electrode assembly (MEA), and $A_{geo}$ and $A_{real}$ are respectively total area and active area of the catalyst layer in the MEA. And, B is a ratio of the surface area of platinum to the hydrogen adsorption/desorption charge, and $W_{pt}$ is mass of the platinum catalyst.

In another general aspect, the present disclosure provides a fuel cell evaluating system for a vehicle comprising the apparatus for evaluating each unit cell in a stack, the distribution of properties in a stack, and the degradation according to the various embodiments of the present disclosure.

In another general aspect, the present disclosure provides a method for evaluating the degradation of unit cells in a fuel cell stack.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
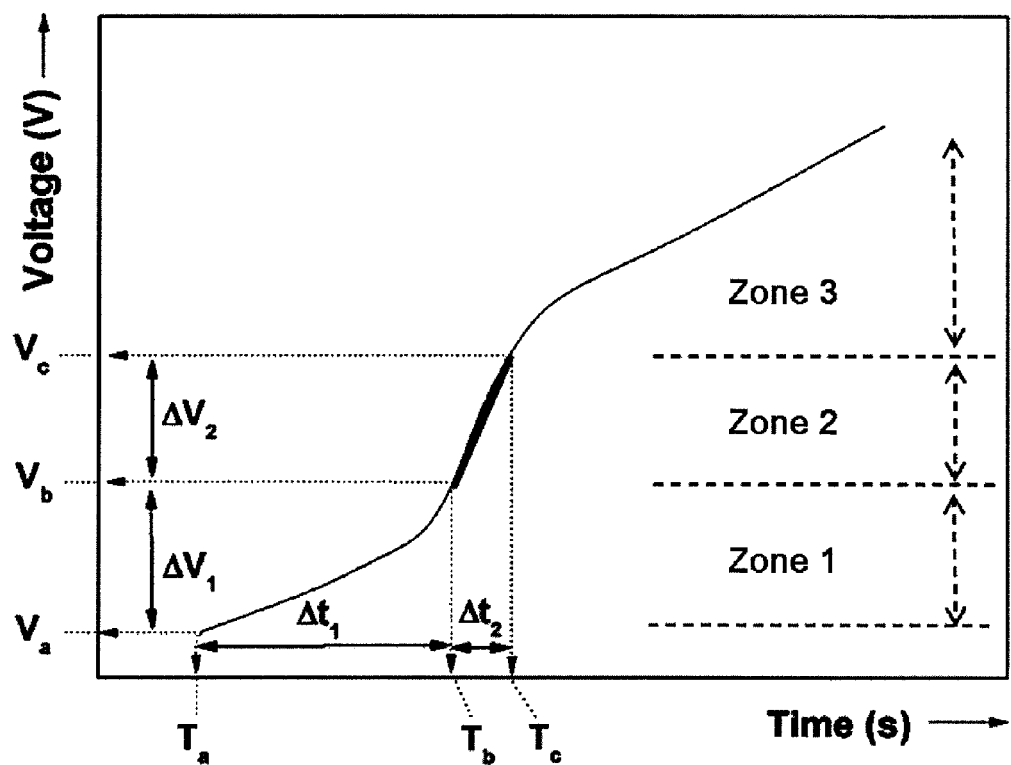
FIG. 1 shows a result of measuring the change in voltage under constant current according to an embodiment of the present disclosure.

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The term "unit cell" herein refers to one unit constituting a fuel cell, and is defined as a structure including a membrane electrode assembly (MEA) and optionally other components combined with the membrane electrode assembly for the purpose of providing a power generation function or other purposes. The other components are not particularly limited, and examples thereof include an anode collector layer, a cathode collector layer, a separator, and the like. The term "membrane electrode assembly (MEA)" is defined as an assembly at least including an electrolyte membrane and anode and cathode electrodes sandwiching the electrolyte membrane therebetween.

Hereinafter, exemplary embodiments will be described in detail with reference to the accompanying drawings.

In an aspect, the present disclosure provides an apparatus for intact evaluation of the unit cells in a fuel cell stack.

By using the intact or non-disassembly evaluation methods according to the various embodiments of the present disclosure, a fuel cell can be evaluated without being disassembled with nitrogen flowing through the fuel cell after the termination of the operation.

wherein the fuel cell stack comprises: (1) n unit cells comprising a first unit cell, a second unit cell, . . . , and an n-th unit cell from left to right; (2) (n+1) separators comprising a first separator adjacent to the left side of the first unit cell, a second separator disposed between the first and second unit cells, . . . , an n-th separator disposed between the (n−1)-th and n-th unit cells, and an (n+1)-th separator adjacent to the right side of the n-th unit cell; and (3) two end plates adjacent respectively to the left side of the first separator and to the right of the (n+1)-th separator; and the apparatus for evaluating the degradation comprises: (a) a current supplying device connected to the two end plates and supplying constant current; (b) at least one voltage measuring device measuring voltage between two separators selected from the (n+1) separators; and (c) a physical property determining device determining at least one physical property from $I_c$, $C_{dl}$, RF and EAS using at least one equation from the following equations from the current value supplied by the current supplying device and the voltage value between the two separators:

$$I_c = C_{dl}\frac{\Delta V_2}{\Delta t_2} + I_{etc} \quad \text{Equation 1}$$

$$Q_H = (I_c - I_{etc})\Delta t_1 - C_{dl}\Delta V_1 \quad \text{Equation 2}$$

$$RF = \frac{A_{real}}{A_{geo}} = \frac{QH}{B \times A_{geo}} \quad \text{Equation 3}$$

$$EAS = \frac{QH}{B \times W_{Pt}} \quad \text{Equation 4}$$

wherein $I_c$ is the supplied constant current, $\Delta t_2$ and $\Delta V_2$ are respectively time change and voltage change of an electrical double layer charging zone when the change in voltage is measured by a galvanostatic method, $C_{dl}$ is a capacity of the electrical double layer, and $I_{etc}$ is current occurring from factors other than hydrogen adsorption/desorption and electrical double layer charging current;

$C_{dl}$ and $I_{etc}$ are respectively obtained as an average slope and an extrapolated y-intercept when at least two $\Delta V_2/\Delta t_2$ and at least two $I_c$ obtained from a galvanostatic experiment performed with at least two current values are respectively plotted as x and y values;

$Q_H$ is hydrogen adsorption/desorption charge, and $\Delta t_1$ and $\Delta V_1$ are respectively time change and voltage change of a hydrogen adsorption/desorption zone when the change in voltage is measured by a galvanostatic method;

RF is a roughness factor which is a ratio of surface area of platinum to area of a catalyst layer of a membrane electrode assembly (MEA), and $A_{geo}$ and $A_{real}$ are respectively total area and active area of the catalyst layer in the MEA; and B is a ratio of the surface area of platinum to the hydrogen adsorption/desorption charge, and $W_{pt}$ is mass of the platinum catalyst.

In an exemplary embodiment, $C_{dl}$ and $I_{etc}$ may be obtained from at least two $\Delta V_2/\Delta t_2$ values and at least two $I_c$ values in a zone where $I_c$ has a positive value.

In another exemplary embodiment, the apparatus for evaluating the degradation of unit cells in a fuel cell stack may further comprise: a fuel supplier for supplying fuel (e.g. hydrogen or liquid fuel such as methanol) to an anode of the fuel cell; and an oxidant supplier for supplying oxidant (e.g. oxygen or air) to a cathode of the fuel cell.

In another exemplary embodiment, the number of the voltage measuring device may be from 1 to n. For instance, when the number of the voltage measuring device is from 1 to (n−1), the voltage measuring device may further comprise a connection terminal switching means allowing at least one of the voltage measuring device to measure voltage multiple times by switching a connection terminal from a measured separator to a separator to be measured.

In another exemplary embodiment, when the number of the voltage measuring device is from 1 to (n−1), the voltage measuring device may further comprise a sequence input means allowing to input the sequence of voltage measurement of the separators.

In another aspect, the present disclosure provides a degradation detecting system for a vehicle comprising the apparatus for evaluating the degradation according to the various embodiments of the present disclosure.

In an exemplary embodiment, the degradation detecting system for a vehicle may further comprise a warning display means warning when at least part or all of the measured physical property values are below predetermined values. It will be easily understood that the predetermined values may be determined easily determined based on the present disclosure and the common knowledge of those skilled in the art, considering the lifespan or replacement cycle of a fuel cell mounted in the vehicle or safety of the vehicle.

In another exemplary embodiment, the degradation detecting system for a vehicle may further comprise a means stopping current flow when a predetermined cutoff voltage is reached.

In another aspect, the present disclosure provides a method for evaluating the degradation of unit cells in a fuel cell stack, wherein the fuel cell stack is the same as described above, the method comprising: (a) supplying constant current to the two end plates; (b) measuring voltage between two separators selected from the (n+1) separators; (c) and determining at least one physical property from $I_c$, $C_{dl}$, RF and EAS using Equations 1-4 from the current value supplied by the current supplying device and the voltage value between the two separators.

In an exemplary embodiment, the method for evaluating the degradation of unit cells in a fuel cell stack may further comprise, prior to the step (c), obtaining $V_a$, $V_b$ and $A_{geo}$. The $V_a$, $V_b$ and $A_{geo}$ values may be easily measured based on the present disclosure and the common knowledge of those skilled in the art. The measured values may be inputted in the step (c) to determine the physical property values.

Hereinafter, the present disclosure will be described in more detail.

When degradation of an MEA of a fuel cell occurs, the surface area of a catalyst (electrochemical active surface area; EAS) changes. Thus, the degradation of a catalyst layer of a fuel cell may be detected by measuring the EAS of the catalyst layer. In addition, the degradation of the MEA of a fuel cell may also be evaluated by measuring the degree of degradation of a catalyst layer support and an electrolyte membrane.

Usually, the measurement of the surface area is achieved by measuring charge generated during adsorption or desorption of hydrogen on platinum surface while flowing nitrogen to the cathode and hydrogen to the anode under control of voltage or current and calculating the surface area from the charge. The reaction formula of the hydrogen adsorption/desorption is as follows:

$$Pt + H^+ + e^- \leftrightarrow Pt-H \qquad \text{Reaction formula 1}$$

In general, the measurement of the surface area of a catalyst such as platinum may be achieved by cyclic voltammetry (CV) using the following equation. However, since this method is applicable only to a half cell or a unit cell, a fuel cell stack should be disassembled to be evaluated by the method. Thus, it is inapplicable to intact evaluation of the stack.

$$Q_H = \int_{V_a}^{V_b} i\, dt = \int_{V_a}^{V_b} i \left( \frac{dV}{v} \right) = \frac{1}{v} \int_{V_a}^{V_b} i\, dV \qquad \text{Equation 5}$$

$$EAS = \frac{Q_H}{B \times W_{Pt}} \qquad \text{Equation 4}$$

wherein $Q_H$: charge required for hydrogen adsorption or desorption;

B: ratio of the surface area of platinum to the hydrogen adsorption/desorption charge (0.21 cm²/mC for a polycrystalline catalyst);

$V_a$, $V_b$: hydrogen adsorption/desorption initiation voltage and hydrogen adsorption/desorption termination voltage, respectively;

v: scan rate (V/sec); and $W_{Pt}$: mass of the platinum catalyst.

In contrast, in the present disclosure, a galvanostatic method is used to allow intact detection of the degradation of the catalyst layer in each cell during the operation of the fuel cell stack without disassembly of the stack. In the galvanostatic method, the change in voltage of each cell is measured with time while supplying constant current to the stack. From the measured value, various parameters for evaluating the degradation can be obtained.

In general, when the change in voltage is measured with time by the galvanostatic method, three zones appear as shown in FIG. 1: zone 1 ($V_a$–$V_b$, $\Delta V_1$), zone 2 ($V_b$–$V_c$, $\Delta V_2$) and zone 3 ($V_c$–). The zone 1 is a hydrogen adsorption/desorption zone where adsorption/desorption of hydrogen and charging of an electrical double layer occur, the zone 2 is an electrical double layer charging zone where charging of the electrical double layer occurs, and the zone 3 is a platinum oxidation/reduction zone where oxidation/reduction of platinum and charging of the electrical double layer occur.

Actually, other reactions such as hydrogen crossover occur in all the three zones. Another technical feature of the present disclosure is that such other reactions are considered when analyzing the electrochemical measurement result, thereby improving accuracy of the intact evaluation and extending the measurable parameters. It is desired that a galvanostatic experiment is performed with at least two current values. After plotting $\Delta V_2/\Delta t_2$ and $I_c$ values obtained from the galvanostatic experiment as x and y values, respectively, $C_{dl}$ and $I_{etc}$ values can be obtained as an average slope and an extrapolated y-intercept.

In an exemplary embodiment of the present disclosure, the $C_{dl}$ and $I_{etc}$ values may be obtained only from the zone where $I_c$ has a positive value, i.e. where voltage increases, since the zone shows good linearity.

EXAMPLES

The examples and experiments will now be described. The following examples and experiments are for illustrative purposes only and not intended to limit the scope of this disclosure.

Example 1

FIG. 1 shows a result of measuring the change in voltage of a unit cell with time by a galvanostatic method according to the present disclosure. The specification and operation condition of the unit cell are shown in Table 1.

TABLE 1

| | |
|---|---|
| Platinum concentration | Anode 0.157 mg/cm²; cathode 0.144 mg/cm² |
| Electrolyte membrane | Nafion 112 |
| Area of MEA | 5 cm × 5 cm |
| Fabrication of MEA | Decal printing |
| Operation temperature | 65° C. |
| Anode H₂ supply rate | 300 sccm (RH 100%) |
| Cathode N₂ supply rate | 120 sccm (RH 100%) |
| Constant current | 50, 100, 200 and 300 mA |

$C_{dl}$ and $I_{etc}$ values can be obtained as an average slope and an extrapolated y-intercept. The $C_{dl}$ and $I_{etc}$ values may be obtained only from the zone where $I_c$ has a positive value, i.e. where voltage increases, since the zone shows good linearity. In contrast, the zone where $I_c$ has a negative value, i.e. where voltage decreases, does not show linearity. It is because overlap of, for example, reduction current of platinum oxides occurs in the zone 2. Thus, data analysis was performed only for the zone where the constant current has a positive value. The obtained result as well a result of calculation based thereon using the foregoing equations is shown in Table 2.

TABLE 2

| $I_c$ (mA) | $\Delta V_2/\Delta t_2$ (mV/s) | $\Delta t_1$ (s) | $Q_H$ (C) | EAS ($m^2/g_{Pt}$) |
|---|---|---|---|---|
| 50 | 0.0505 | 18.95 | 0.290 | 38.4 |
| 100 | 0.188 | 6.323 | 0.327 | 43.4 |
| 200 | 0.426 | 2.405 | 0.293 | 38.8 |
| 300 | 0.680 | 1.552 | 0.304 | 40.3 |
| Average | — | — | 0.30 ± 0.02 | 40 ± 2 |

Example 2

Figure 5:
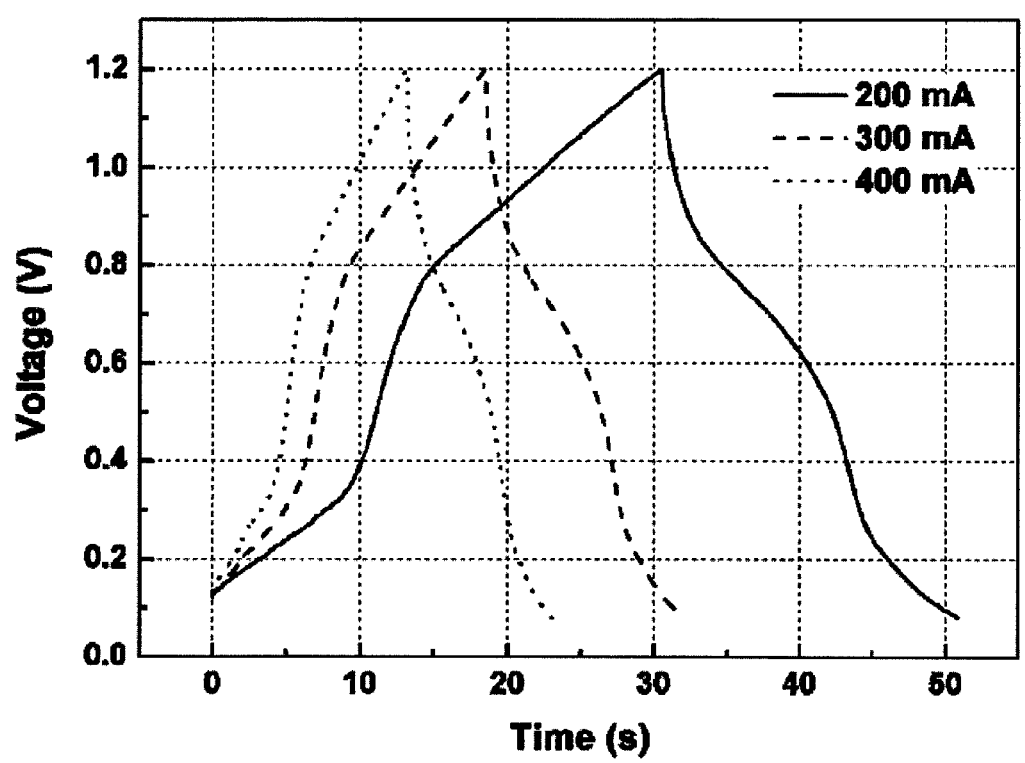
Figure 6:
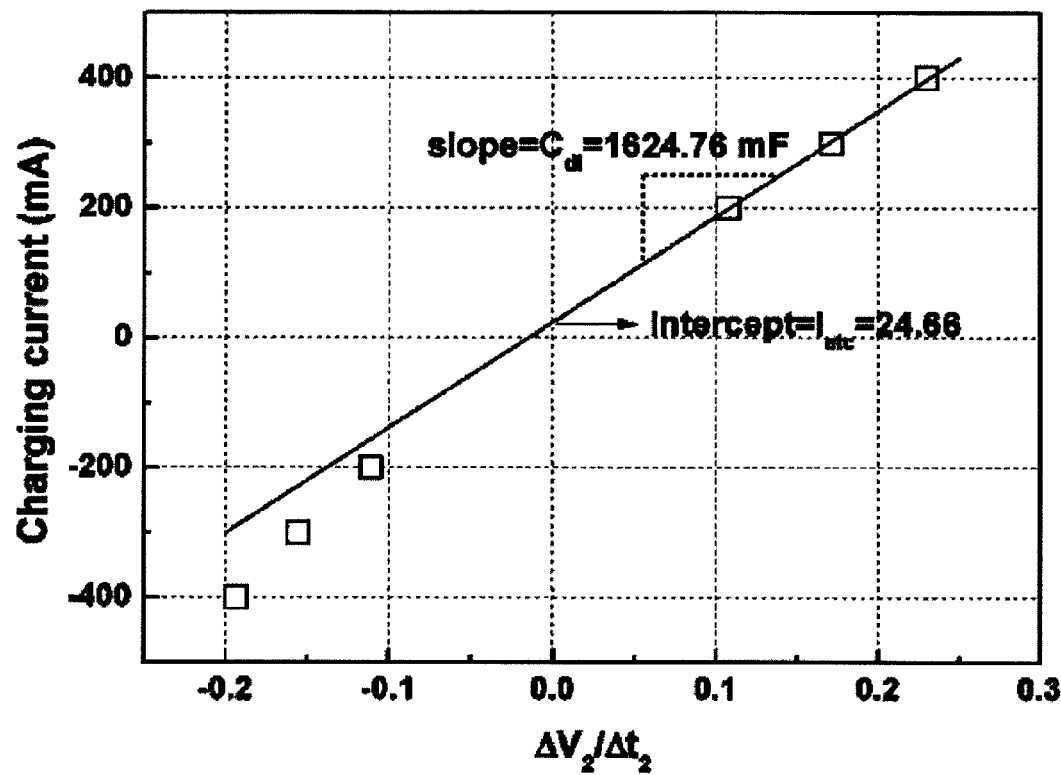
FIG. 6 shows how to obtain $C_{dl}$ and $I_{etc}$ based on the analysis result for the first cell.

An experiment was performed in the same manner as Example 1, using a common fuel cell stack consisting of 5 unit cells, as described in Table 3. The accurate composition of the MEA could not be known since the fuel cell stack was used. In particular, electrochemical analysis was carried out for the first, third and fifth cells of the stack, and the result is shown in FIGS. 5-6.

Figure 2:
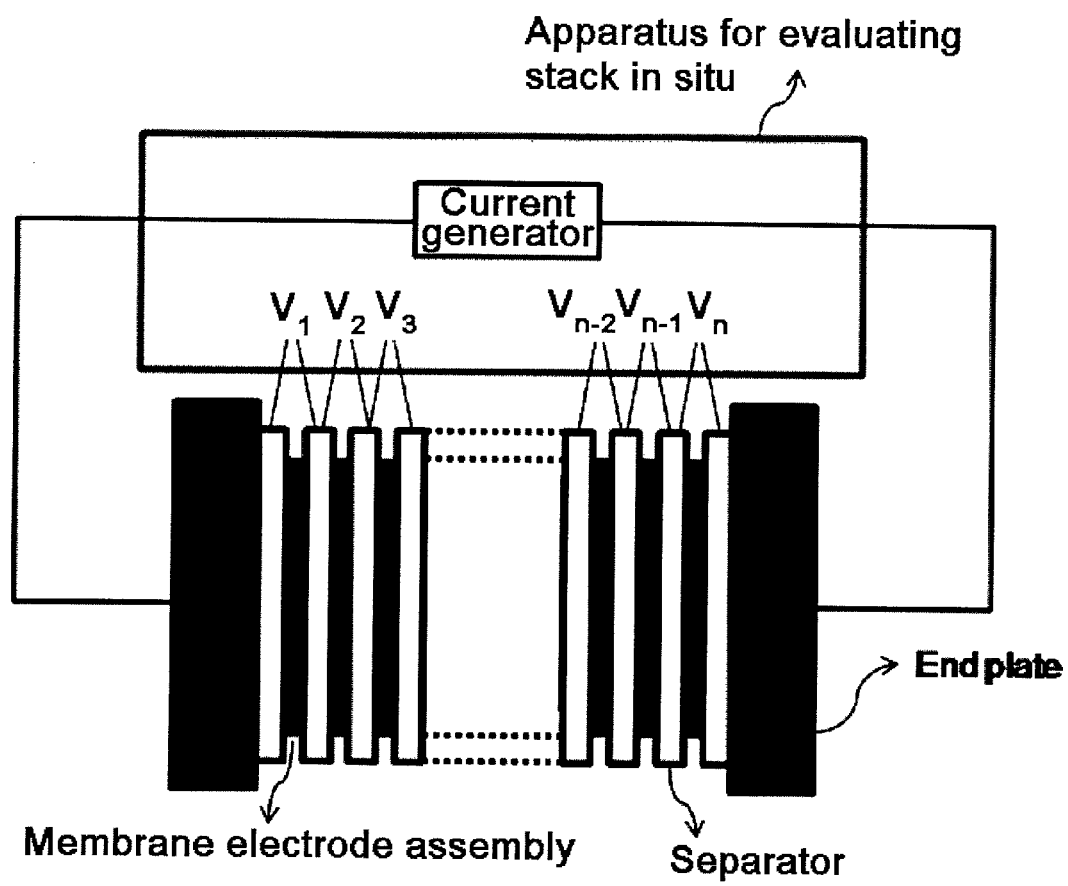
FIG. 2 schematically shows an apparatus for evaluating a fuel cell stack using a galvanostatic method.

FIG. 2 schematically illustrates the evaluation of a fuel cell stack by the galvanostatic method. The stack consists of n unit cells. When constant current is supplied from a current supplying device (galvanostat), the constant current flows through the whole stack, and the change in voltage of each cell with time is measured by using a voltage measuring device (potentionstat). Usually, the measurement is performed while supplying hydrogen gas to the anode and supplying nitrogen gas to the cathode.

Since the stack has n cells, n voltage measuring devices are necessary to measure the voltage of all the cells at once. But, for the purpose of cost saving, the number of the voltage measuring devices may be reduced and, instead, the number of measurements may be increased. For instance, when n/2 voltage measuring devices are installed, measurements may be performed 2 times to measure the n cells. More specifically, when a current of 100 mA is supplied to a cell with an area of 25 cm$^2$, it takes about 40 seconds for each measurement. Therefore, about 67 minutes is spent for 100 measurements. But, when 10 voltage measuring devices are used, the measurement is completed within about 7 minutes. As such, the number of the voltage measuring devices and the time required for the measurement may be selected considering user convenience and cost.

For this, in an exemplary embodiment of the present disclosure, when the number of the voltage measuring device is from 1 to (n−1), the voltage measuring device may further comprise a sequence input means allowing to input the sequence of voltage measurement of the separators.

Figure 3:
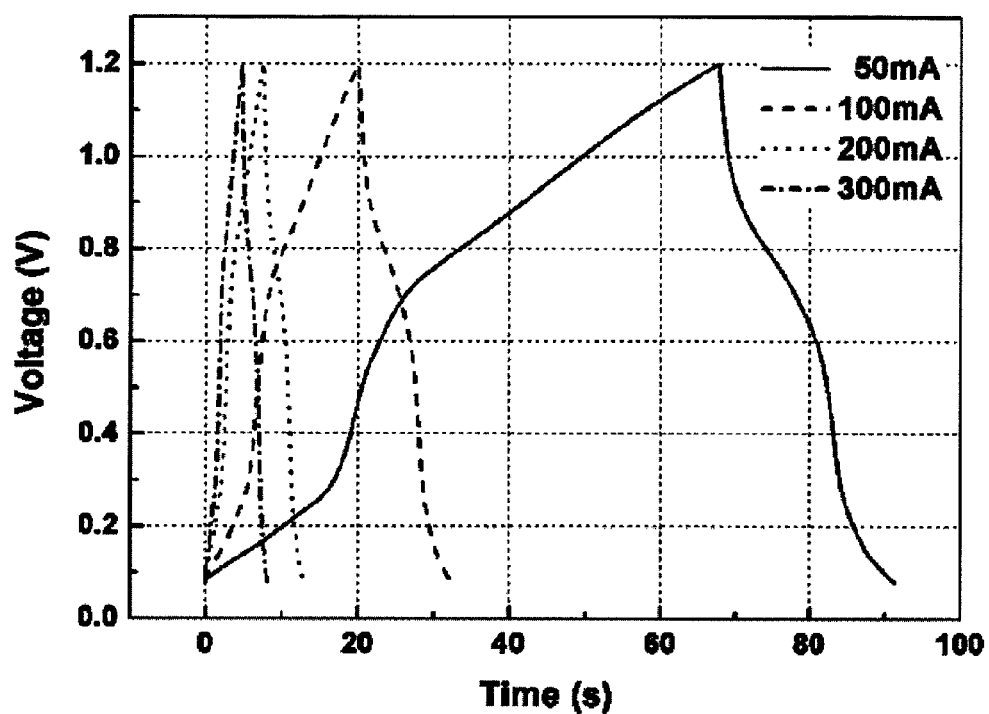
FIG. 3 and FIG. 5 show a result of measuring the change in voltage by a galvanostatic method at different current values according to an embodiment of the present disclosure (FIG. 5 shows a V-T curve of the fifth cell)
Figure 4:
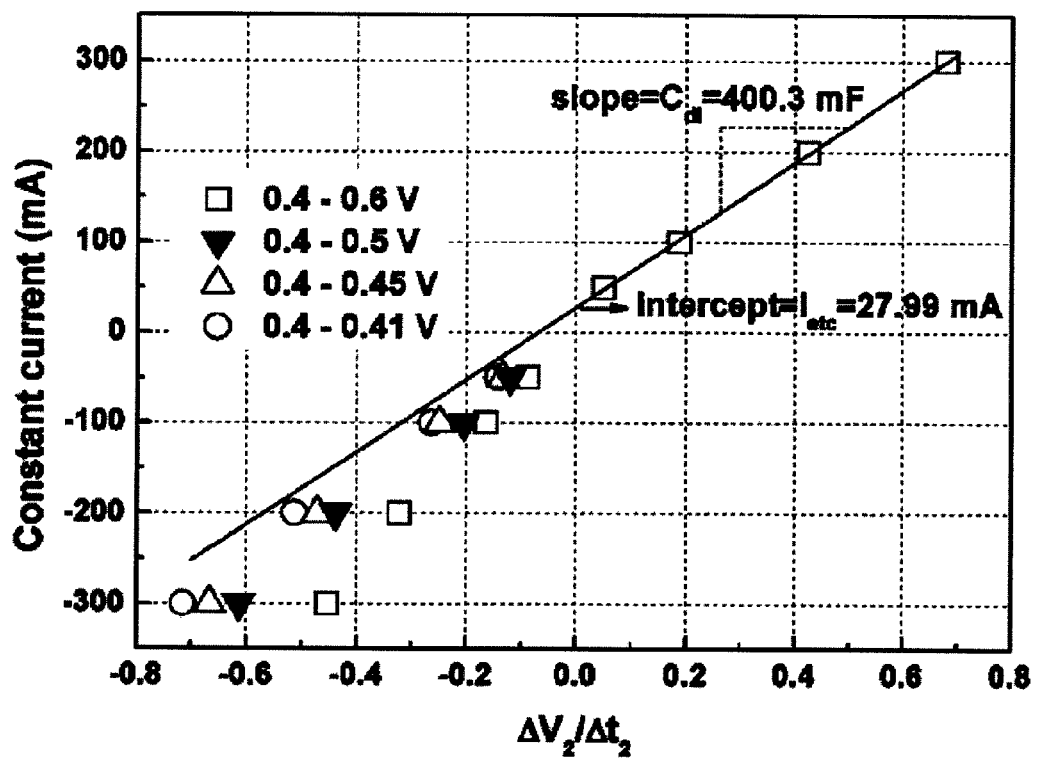
FIG. 4 shows how to obtain $C_{dl}$ and $I_{etc}$ based on the unit cell analysis result.

Measurement was made by the galvanostatic method at four different current values as described above. The result is shown in FIG. 3. The $\Delta V_2/\Delta t_2$ and $I_C$ values obtained from the galvanostatic experiment were plotted as x and y values, respectively. The result is shown FIG. 4.

TABLE 3

| Area of MEA | 5 cm × 5 cm |
|---|---|
| Operation temperature | 65° C. |
| Anode H$_2$ supply rate | 300 sccm (RH 100%) |
| Cathode N$_2$ supply rate | 120 sccm (RH 100%) |
| Constant current | 200, 300 and 400 mA |

Figure 7:
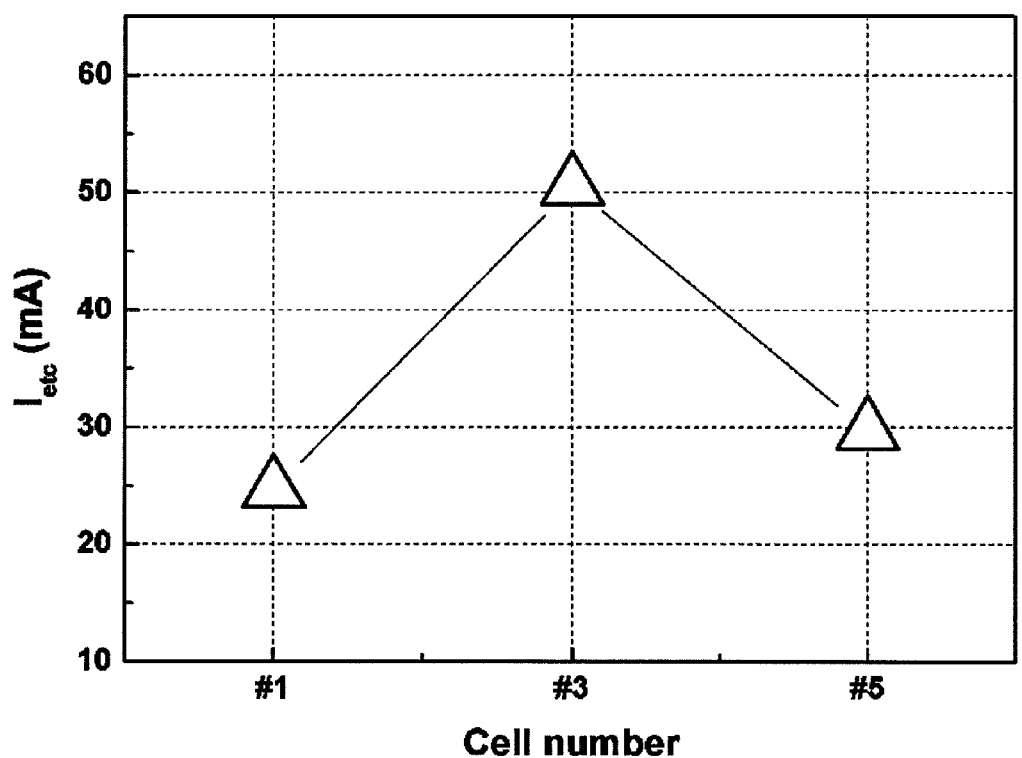
FIGS. 7-9 depict the result of FIG. 6.
Figure 8:
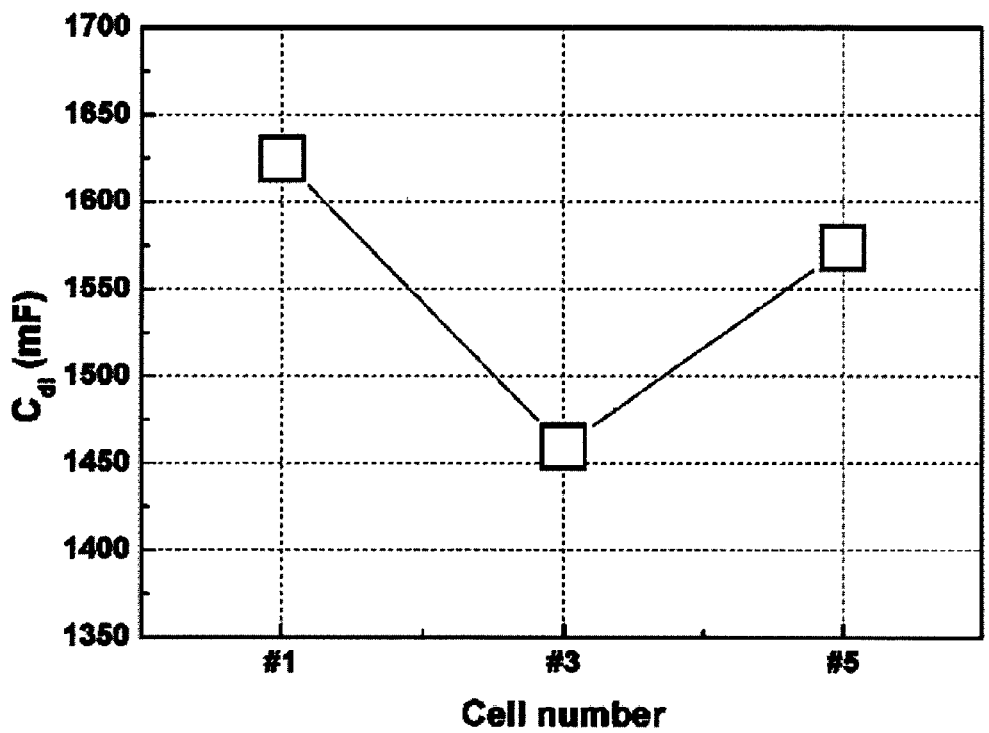
Figure 9:
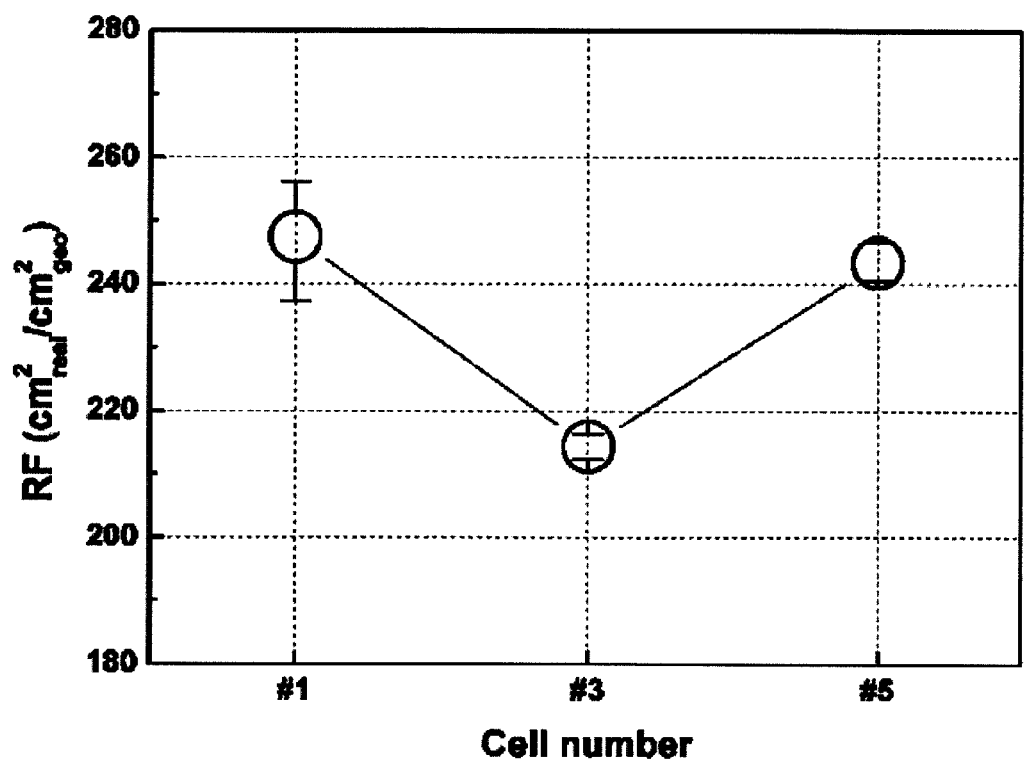

The obtained result and a result of calculation based thereon using the foregoing equations are shown in Table 4 FIGS. 7-9.

TABLE 4

| Cell # | $I_c$ (mA) | $\Delta V_2/\Delta t_2$ (mV/s) | $\Delta t_1$ (s) | $Q_H$ (C) | RF |
|---|---|---|---|---|---|
| 1 | 200 | 0.1071 | 10.333 | 1.346 | 256.3 |
|  | 300 | 0.1712 | 6.383 | 1.306 | 248.8 |
|  | 400 | 0.2301 | 4.470 | 1.246 | 237.4 |
|  | Average | — | — | 1.30 ± 0.05 | 248 ± 9 |
| 3 | 200 | 0.1030 | 10.298 | 1.114 | 212.3 |
|  | 300 | 0.1700 | 6.1960 | 1.136 | 216.4 |
|  | 400 | 0.2400 | 4.3740 | 1.125 | 214.2 |
|  | Average | — | — | 1.12 ± 0.01 | 214 ± 2 |
| 5 | 200 | 0.1073 | 10.107 | 1.296 | 246.8 |
|  | 300 | 0.1738 | 6.328 | 1.275 | 242.9 |
|  | 400 | 0.2343 | 4.548 | 1.262 | 240.5 |
|  | Average | — | — | 1.28 ± 0.01 | 243 ± 3 |

As seen from FIG. 7, the $I_{etc}$ value of the third cell was higher than other nearby cells, suggesting that hydrogen crossover occurred relatively more frequently. This means that the degradation of membrane is the severest in the third cell.

Also, as seen from FIG. 8, the $C_{dl}$ value of the third cell was lower than that of the nearby cells, suggesting that the capacity of the electrical double layer is relatively lower. This means that the sum of the surface area of the platinum catalyst and the carbon support in the third cell is significantly lower than that of the nearby cells.

And, as seen from FIG. 9, the RF value of the third cell was lower than that of the nearby cells, suggesting that the degradation of the platinum catalyst is severer in the third cell than the nearby cells.

The apparatus and method for an intact evaluation of the degradation of an MEA of a fuel cell according to the present disclosure allow the detection of the degradation of the unit cells of the fuel cell without disassembly of the stack, thus greatly reducing the time required for the detection and analysis thereof. Further, they make it possible to analyze and evaluate the degradation of an MEA as the degradation of the electrolyte membrane, the degradation of the catalyst layer, and the degradation of the catalyst support.

While the present disclosure has been described with respect to the specific embodiments, it will be apparent to those skilled in the art that various changes and modifications may be made without departing from the spirit and scope of the disclosure as defined in the following claims.

What is claimed is:

1. An evaluation apparatus for an intact fuel cell stack, the apparatus comprising:
   a galvanostat configured to apply a constant current ($I_c$) across end plates of the fuel cell stack;
   a voltmeter configured to measure voltage across a unit cell of the intact fuel cell stack and time data when the constant current ($I_c$) is applied across end plates of the intact fuel cell stack;
   an oxidant supplier for supplying oxidant to a cathode of the intact fuel cell stack; and a physical property determining device configured to input data from the galvanostat and the voltmeter and configured to determine:
a capacity of electrical double layer ($C_{dl}$) across the unit cell,
a hydrogen adsorption/desorption charge ($Q_H$) at the unit cell,
a roughness factor (RF) of the unit cell, and
an electrochemical active surface area (EAS) of the unit cell,
wherein $C_{dl}$ is determined in accordance to $$I_c = C_{dl}\frac{\Delta V_2}{\Delta t_2} + I_{etc},$$

in which
$\Delta V_2$ is a second voltage change determined along a resultant voltage/time curve generated from the measured voltage and time data when $I_c$ is applied across the unit cell,
$\Delta t_2$ is a second time zone corresponding to a duration of the $\Delta V_2$ along the resultant voltage/time curve, and
$I_{etc}$ is a current associated with factors other than $Q_H$ and $C_{dl}$, wherein $I_{etc}$ is extrapolated from a y-intercept and $C_{dl}$ is obtained as a slope from a graph of $$\frac{\Delta V_2}{\Delta t_2}$$

versus $I_c$ when $$\frac{\Delta V_2}{\Delta t_2}$$

is plotted along an x-axis and $I_c$ is plotted along a y-axis, wherein the $Q_H$ is determined in accordance to
$Q_H = (I_c - I_{etc})\Delta t_1 - C_{dl}\Delta V_1$,
in which
$\Delta V_1$ is a first voltage change determined along the resultant voltage/time curve, and
$\Delta t_1$ is a first time zone corresponding to a duration of the $\Delta V_1$ along the resultant voltage/time curve,
wherein RF is determined in accordance to $$RF = \frac{Q_H}{B \times A_{geo}},$$

in which
B is a ratio of $A_{real}$ to $Q_H$,
$A_{geo}$ is an active surface area of the catalyst of the unit cell, and
$A_{real}$ is a total surface area of the catalysts of the unit cell,
wherein EAS is determined in accordance to $$EAS = \frac{Q_H}{B \times W_{Pt}},$$

in which $W_{Pt}$ is a mass of the catalyst of the unit cell, wherein when calculated values of any one of $C_{dl}$, $I_{etc}$, and EAS are determined to be below corresponding predetermined values then the intact fuel cell stack is evaluated as degraded.

2. The evaluation apparatus of claim 1, wherein the physical property determining device is also configured to determine RF in accordance to $$RF = \frac{A_{real}}{A_{geo}}.$$

3. The evaluation apparatus of claim 1, wherein the intact fuel cell stack comprises a plurality of unit cells.

4. The evaluation apparatus of claim 1, wherein the catalyst of the unit cell comprises a platinum catalyst.

5. The evaluation apparatus of claim 1, wherein $A_{real}$ and $W_{Pt}$ are predetermined parameters of the unit cell.

6. The evaluation apparatus of claim 1, wherein when the catalysts comprises a polycrystalline catalyst then B is 0.21 cm$^2$/mC.

7. The evaluation apparatus of claim 1, wherein $\Delta t_1$ corresponds to when hydrogen adsorption/desorption occurs and when the electric double layer charges.

8. An evaluation apparatus for an intact fuel cell stack, the apparatus comprising:
a galvanostat configured to apply a constant current ($I_c$) across end plates of the fuel cell stack;
a voltmeter configured to measure voltage across a unit cell of the intact fuel cell stack and time data when the constant current ($I_c$) is applied across end plates of the intact fuel cell stack;
an oxidant supplier for supplying oxidant to a cathode of the intact fuel cell stack; and
a physical property determining device configured to input data from the galvanostat and the voltmeter and configured to determine:
a capacity of electrical double layer ($C_{dl}$) across the unit cell, and wherein
$C_{dl}$ is determined in accordance to $$I_c = C_{dl}\frac{\Delta V_2}{\Delta t_2} + I_{etc},$$

in which $I_{etc}$ is a current associated with factors other than $C_{dl}$ and a hydrogen adsorption/desorption charge ($Q_H$) at the unit cell, wherein $I_{etc}$ is extrapolated from a y-intercept and $C_{dl}$ is obtained as a slope from a graph of $$\frac{\Delta V_2}{\Delta t_2}$$

versus $I_c$ when $$\frac{\Delta V_2}{\Delta t_2}$$

is plotted along an x-axis and $I_c$ is plotted along a y-axis,

ΔV₂ is a second voltage change determined along a resultant voltage/time curve from the measured voltage and time data when $I_c$ is applied across the unit cell, Δt₂ is a second time zone corresponding to a duration of the ΔV₂ along the resultant voltage/time curve, wherein when a calculated value of $C_{dl}$ is determined to be below a predetermined value of $C_{dl}$ then the intact fuel cell stack is evaluated as degraded, wherein when a calculated value of $I_{etc}$ is determined to be below a predetermined value then the intact fuel cell stack is evaluated as degraded, wherein the physical property determining device is configured to determine $Q_H$ in accordance to $$Q_H = (I_c - I_{etc})\Delta t_1 - C_{dl}\Delta V_1,$$

in which
ΔV₁ is a first voltage change determined along the resultant voltage/time curve, and
Δt₁ is a first time zone corresponding to a duration of the ΔV₁ along the resultant voltage/time curve.

9. The apparatus of claim 8, wherein the physical property determining device is further configured to determine a roughness factor (RF) of the unit cell in accordance to $$RF = \frac{Q_H}{B \times A_{geo}},$$

in which
$A_{geo}$ is an active surface area of the catalyst of the unit cell,
B is a ratio of $A_{real}$ to $Q_H$, and
$A_{real}$ is a total surface area of the catalysts of the unit cell,
wherein when a calculated value of RF is determined to be below a predetermined value of RF then the intact fuel cell stack is evaluated as degraded.

10. The apparatus of claim 8, wherein the physical property determining device is further configured to determine an electrochemical active surface area (EAS) in accordance to $$EAS = \frac{Q_H}{B \times W_{Pt}},$$

in which $W_{Pt}$ is a mass of the catalyst of the unit cell.

11. The evaluation apparatus of claim 9, wherein the physical property determining device is also configured to determine RF in accordance to $$RF = \frac{A_{real}}{A_{geo}}.$$

12. A method of evaluating an intact fuel cell stack, the method comprising:
providing an oxidant supplier to a cathode of the intact fuel cell stack;
applying a constant current ($I_c$), using a galvanostat, across end plates of the intact fuel cell stack;
measuring voltage and time data, using a voltmeter, across a unit cell of the intact fuel cell stack when the constant current ($I_c$) is applied across end plates of the fuel cell stack; and
generating a voltage/time curve from the measured voltage and time data when $I_c$ is applied across the unit cell;

determining a first voltage change (ΔV₁), a first time zone (Δt₁), a second voltage change (ΔV₂), and a second time zone (Δt₂) from the measured voltage and time data;

determining an electrical double layer ($C_{dl}$) across the unit cell from the voltage/time curve;

evaluating a severity of degradation of the unit cell from a calculated value of $C_{dl}$ such that when the calculated value of $C_{dl}$ is determined to be below a predetermined value of $C_{dl}$ then the intact fuel cell stack is evaluated as degraded, wherein $C_{dl}$ is determined in accordance to $$I_c = C_{dl}\frac{\Delta V_2}{\Delta t_2} + I_{etc},$$

in which
ΔV₂ is the second voltage change determined along the voltage/time curve generated from the measured voltage and time data when $I_c$ is applied across the unit cell, Δt₂ is the second time zone corresponding to a duration of the ΔV₂ along the voltage/time curve, and $I_{etc}$ is a current associated with factors other than $C_{dl}$ and a hydrogen adsorption/desorption charge ($Q_H$) at the unit cell, wherein $I_{etc}$ is extrapolated from a y-intercept and $C_{dl}$ is obtained as a slope from a graph of $$\frac{\Delta V_2}{\Delta t_2}$$

versus $I_c$ when $$\frac{\Delta V_2}{\Delta t_2}$$

is plotted along an x-axis and $I_c$ is plotted along a y-axis, wherein evaluating the severity of degradation of the unit cell also uses a calculated value of $I_{etc}$; and determining $Q_H$ in accordance to $$Q_H = (I_c - I_{etc})\Delta t_1 - C_{dl}\Delta V_1,$$

in which
ΔV₁ is a first voltage change determined along the resultant voltage/time curve, and
Δt₁ is a first time zone corresponding to a duration of the ΔV₁ along the resultant voltage/time curve.

13. The method of claim 12, further comprising:
determining a roughness factor (RF) of the unit cell in accordance to $$RF = \frac{Q_H}{B \times A_{geo}},$$

in which
- $A_{geo}$ is an active surface area of the catalyst of the unit cell,
- B is a ratio of $A_{real}$ to $Q_H$, and
- $A_{real}$ is a total surface area of the catalysts of the unit cell, wherein when the calculated value of RF is determined to be below a predetermined value of RF then the intact fuel cell stack is evaluated as degraded.

14. The method of claim 13, further comprising:
determining an electrochemical active surface area (EAS) of the unit cell in accordance to $$EAS = \frac{Q_H}{B \times W_{Pt}},$$

in which $W_{Pt}$ is a mass of the catalyst of the unit cell, wherein evaluating the severity of degradation of the unit cell also uses a calculated value of EAS.

* * * * *